US009235409B1

(12) United States Patent
Guo et al.

(10) Patent No.: US 9,235,409 B1
(45) Date of Patent: Jan. 12, 2016

(54) DEPLOYMENT VERSION MANAGEMENT

(71) Applicant: Amazon Technologies, Inc., Reno, NV (US)

(72) Inventors: Jiaqi Guo, Seattle, WA (US); Gang Li, Bellevue, WA (US); Matthew David Klein, Seattle, WA (US); Zhe Fu, San Jose, CA (US); Baogang Song, Bellevue, WA (US); Weizhong Hua, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 239 days.

(21) Appl. No.: 13/664,314

(22) Filed: Oct. 30, 2012

(51) Int. Cl.
*G06F 9/44* (2006.01)
(52) U.S. Cl.
CPC .................................. *G06F 8/68* (2013.01)
(58) Field of Classification Search
USPC ......................................................... 717/170
See application file for complete search history.

(56) References Cited

U.S. PATENT DOCUMENTS

| 2004/0003266 A1* | 1/2004 | Moshir et al. ................. 713/191 |
| 2004/0111694 A1* | 6/2004 | Wang et al. .................... 717/100 |
| 2007/0220507 A1* | 9/2007 | Back ........................ G06F 8/71 717/170 |

* cited by examiner

*Primary Examiner* — Hang Pan
(74) *Attorney, Agent, or Firm* — Hogan Lovells US LLP

(57) ABSTRACT

Customers wanting to deploy software packages, or updates to those packages, across a group of servers or other computing resources can rely upon a component such as a resource manager to manage the deployment. The resource manager can utilize a data structure that stores deployment information by Revision number, and merges information for each verified deployment into a Mainline for those resources. Each Deployment can involve an Individual Release or a Baseline Release, and the importance of those Releases can be determined with respect to a current snapshot of the Mainline. Such an approach enables important Release and Deployment information to be quickly determined and obtained, which can help with configuring and scheduling future Deployments.

24 Claims, 7 Drawing Sheets

DEPLOYMENT VERSION MANAGEMENT

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A customer typically will rent, lease, or otherwise pay for access to resources through the cloud, such that the customer does not have to purchase and maintain the hardware and/or software to provide access to these resources. In many cases, the resources will include a fleet of host machines or servers that are operable to execute various applications, and in at least some cases can run one or more virtual machines associated with those applications. The environment can be a distributed environment, such that portions of the fleet of servers can be located in different geographical areas. When updates to various applications are to be deployed for a large number of servers in a variety of different areas, it can be desirable to stagger the deployment to these various areas in order to be able to more easily manage and/or monitor aspects of the deployment. For a large number of users who can each deploy a number of application updates to a variety of different servers across the environment, managing the versions and deployments over time can be complex, and failure to properly determine which versions of which applications are deployed on which servers can potentially result in errors or even data loss or corruption, among other such potential problems.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to managing computing resources. In particular, various embodiments facilitate the updating of software on target computing devices, such as host machines or servers, in an electronic environment. In at least some embodiments, customers can deploy and update software packages, or software version entities, to execute on at least a subset of a group of servers, host machines, or other such computing resources. When a customer wants to deploy any of these software packages, or updates to the packages, across at least a portion of the computing resources, the customer can submit information for the deployment. A component such as a resource manager can then manage the deployment. The resource manager can utilize a data structure that stores deployment information by Revision number, and merges information for each verified Deployment into a Mainline for those resources. Each Deployment can involve an Individual Release or a Baseline Release, and the importance of those Releases can be determined with respect to a current snapshot of the Mainline. Such an approach enables important Release and Deployment information to be quickly determined and obtained, which can help with configuring and scheduling future Deployments.

Various other applications, processes, and uses are presented below with respect to the various embodiments.

Figure 1:
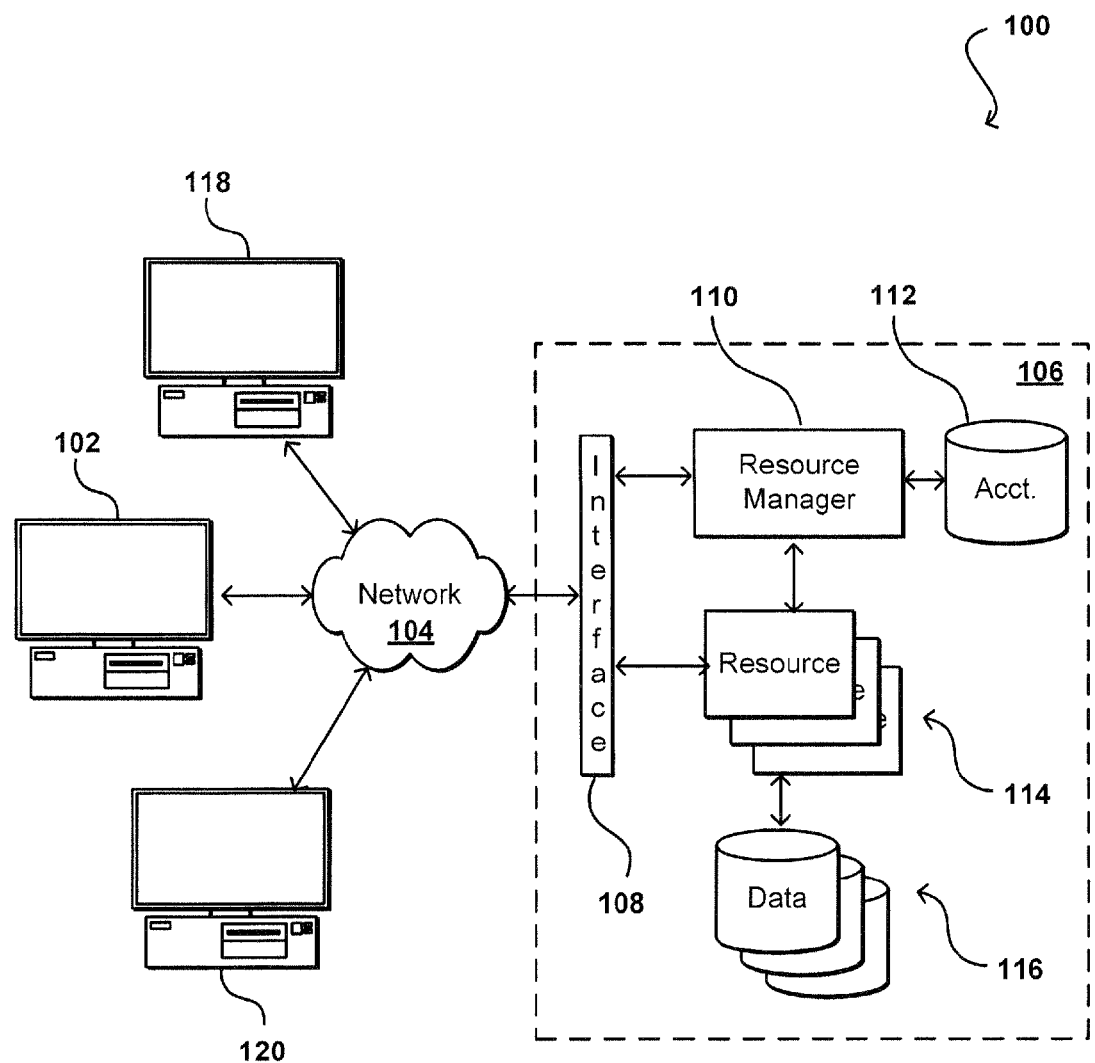
FIG. 1 illustrates an example environment in which various embodiments can be implemented.

FIG. 1 illustrates an example environment 100 in which aspects of the various embodiments can be implemented. In this example a customer of a distributed environment 106, such as a multi-tenant environment hosting one or more shared computing resources, is able to utilize a client device 102 to submit requests across at least one network 104 to at least one designated address or interface of the distributed environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The distributed environment 106 can be supported and/or offered by a resource provider, and can include any appropriate components for receiving requests and returning information or performing actions in response to those requests. As an example, the environment might include a fleet of Web servers, application servers, or host machines for receiving and/or processing requests, then returning data, Web pages, video, audio, or other such content or information in response to the request. In many cases, the customer will have an account with the provider of the distributed environment that indicates which resources or types of resources the customer can access, an amount of that access, types of tasks that can be performed with that access, or other such terms. One or more users might be associated with the customer, and thus can be able to access the resources per the customer account. Other customers can use computing devices 118, 120 to access the same or other resources in the distributed environment, as may include different host machines or different virtual machines running on one or more host machines, among other such options.

In various embodiments, the distributed environment 106 may include various types of resources that can be utilized by multiple users for a variety of different purposes. In at least some embodiments, all or a portion of a given resource or set of resources might be allocated to a particular customer or allocated for a particular task, for at least a determined period of time. The sharing of these resources from a distributed environment is often referred to as resource sharing, Web services, or "cloud computing," among other such terms and depending upon the specific environment and/or implementation. In this example the distributed environment includes a plurality of resources 114 of one or more types. These types can include, for example, application servers operable to process instructions provided by a user or database servers operable to process data stored in one or more data stores 116 in response to a user request. As known for such purposes, the customer can also reserve at least a portion of the data storage in a given data store. Methods for enabling a customer to reserve various resources and resource instances are well known in the art, such that detailed description of the entire process, and explanation of all possible components, will not be discussed in detail herein.

In at least some embodiments, a user wanting to utilize at least a portion of the resources 114 can submit a request that is received to an interface layer 108 of the multi-tenant environment 106. The interface layer can include application programming interfaces (APIs) or other exposed interfaces enabling a user to submit requests to the multi-tenant environment. The interface layer 108 in this example can also include other components as well, such as at least one Web server, routing components, load balancers, and the like. When a request to provision a resource, such as a virtual machine, is received to the interface layer 108, for example, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account, or is associated with a customer having an existing account, with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user is not associated with a valid account with the provider, an associated account does not enable access to the type of resources specified in the request, or another such reason is preventing the user from obtaining access to such resources, a communication can be sent to the user (or associated customer) to enable the user to create or modify an account, or change the resources specified in the request, among other such options.

Once the user and/or request is authenticated, the account verified, and the resources allocated, the user can utilize the allocated resource(s) for the specified capacity, amount of data transfer, period of time, or other such metric. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes.

The resource manager 110 (or another such system or service) in this example can also function as a virtual layer of hardware and software components that handles control functions in addition to management actions, as may include provisioning, version management, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

As mentioned, a component (or service) such as a resource manager can be tasked with managing the provisioning of resources, as well as the updating of those resources. In at least some embodiments, a customer can submit a request to the resource manager to begin updating one or more deployments across the distributed environment. In many instances, the customer will not want to have to deal with various functional aspects of the deployment, such as where the deployment is to occur, and when to deploy at each of those locations. The customer may instead prefer to provide the information necessary to update an application, or other such package, and rely upon the functionality of the distributed environment to manage the physical deployment. Such an approach can be complex for the resource management component, however, as there can be multiple customers at any given time who are interested in performing deployments across the environment. The resource manager then must not only be able to track and schedule all of these deployments, but must also keep track of the versions deployed at each location such that no deployment inadvertently impacts another deployment.

Approaches in accordance with various embodiments utilize a deployment data structure for purposes of tracking the deployment instructions of various users. When a component such as a resource manager wants to perform a deployment, the resource manager can analyze the information stored according to the data structure to determine important deployment information, such as which versions of which packages were deployed in which locations. The resource manager can obtain from the data structure a snapshot of the current deployment, which can be used as a starting point for the update. Each update can be associated with an updated revision number of the deployment state, which can be used to ensure each future revision builds on the current revision. As deployments occur, those deployments can be updated with information for revisions implemented since the start of that deployment process. Such a data structure can be efficient for a computing process to access and utilize in at least some embodiments.

An example data structure in accordance with various embodiments builds upon at least two concepts: a Release and a Deployment. A Release as used herein refers to a set of changes, as may include version information for one or more packages, that is to be deployed to appropriate locations across a distributed environment. The Release does not include information about where or when to deploy, but instead includes information such as upgrade information that is to be deployed to each host machine or other such component within the scope of the deployment. A Deployment, as used herein, refers to the action of causing the release to be installed or otherwise made available on a particular host or set of host machines. A Deployment thus includes information such as which Release to deploy and where to deploy the Release (e.g., which hosts), as well as when to start at least portions of the deploying. In at least some embodiments, a Deployment can include a list or other identification of a subset of hosts of the environment, as well as timing information as to when each host or set of hosts is to receive the corresponding Release.

The data structure also defines at least three different types of Releases. A first type is referred to herein as a Mainline Release. A Mainline refers to a repository that records the state of a set of software deployments. A Mainline can contain information about the latest version of each of several deployed packages. A resource manager or other entity can determine the current state of the fleet, or at least the latest version of each package deployed on at least a portion of that fleet, by obtaining a copy of the Mainline. The Mainline thus can provide information about the current deployment, and is not used to deploy future packages. There also can be at least two deployable releases, referred to herein as Baseline and Individual Releases. A Baseline Release enables a customer to bundle updates to be deployed in a single action. The Baseline Release utilizes a Baseline as a starting point, where the Baseline functions as a snapshot of the Mainline release, providing information about the most recent version of any package previously deployed across a respective fleet. A Baseline in some embodiments can be used to deploy the current, latest version of each package that accumulated in the past to a new set of host machines in the environment. The Baseline also can be used as a starting point for an additional deployment or upgrade. For example, a customer can obtain a copy of a Baseline and store a local copy of the baseline for purposes of testing and/or configuration an update for deployment. Such an approach allows the update to be tested against a specific state of the fleet, without actually affecting or impacting the fleet. A customer then can make changes using the Baseline and schedule deployment against the Baseline as well.

Once the update is ready to be deployed, the Deployment can be scheduled by the resource manager. As discussed, the Deployment could be scheduled at different times for different locations across the distributed environment. In at least some embodiments, the resource manager (or another appropriate component) must first verify the Deployment before proceeding. During the verification process, the resource manager might choose to merge the changes from the Mainline into the Deployment, such that the update can occur with respect to any updates since the Baseline for the update was obtained. After the Deployment is verified and the update passes any quality control processes, the changes from the Baseline can be merged into the Mainline such that the Mainline represents the most current version of any package updated by the Baseline Release. Thus, the Baseline once deployed becomes a permanent part of the Mainline.

The data structure also includes an Individual Release type. It might be the case that the customer wants to deploy a single package and may not care about the state of other packages. Accordingly, the customer can create a small space for working on the Individual type of release, without first obtaining a Baseline from which to work. The customer can create and deploy Individual Releases independent of how other Releases are deployed to the same group of machines. Once the software is properly verified, the information for the Individual Release can be merged with the Mainline and become a permanent part of the Mainline.

In order for the resource manager to be able to manage all these deployments, the data structure needs to be able to store the information for all the Releases and Deployments, but be able to surface only those Deployments that are important for a future Deployment at any time. The resource manager can examine the data in the data structure and provide the customer with a small number of important Release deployments, even though there may have been thousands of deployments or more across the distributed environment. The data structure then needs to include information about when certain events occurred, and the relative importance of those events. Specifically, if a customer creates a Baseline Release and deploys that Baseline to every host machine in the environment, the Mainline should reflect the information from that Baseline release and a customer should not have to worry about any deployments before that Baseline release, as the Baseline release builds upon the Mainline at the time the Baseline was created. Thus, all previous events (e.g., deployments) will be reflected in the latest Baseline, and thus the Mainline after the Baseline is merged.

Accordingly, the data structure includes branching and versioning information in at least some embodiments. The data structure can utilize a Revision number, or other versioning information, to reflect each time a change is made to the Mainline, such as when an Individual or Baseline Release is deployed. The Revision number can assist in determining effective releases and/or determining which releases are important. For example, consider the portions 200, 220 of a Revision timeline illustrated in FIGS. 2(*a*) and 2(*b*). In this example, there is a first Revision that corresponds to the initial deployment of three different packages, a, b, and c. As illustrated, the version number for packages a, b, and c for Revision 1 are each 1.0. While the state of the system is in Revision 1, an Individual Release 202 for customer A is started. Because the Release is an Individual Release, the Release does not need to start with a Baseline and thus can be assigned a Revision value of 0. Each Individual Release can start with a value of 0, indicating that the update is not with respect to any Baseline or other state of the system. When the Individual Release is deployed and verified, information for the Individual Release 204 can be merged back into the Mainline 210. As illustrated, the Revision version of package a has gone from 1.0 to 2.0, although other update values can be used as well within the scope of the various embodiments. Further, to reflect the update the Revision number for the Mainline has been updated to 2.0.

Figure 2A:
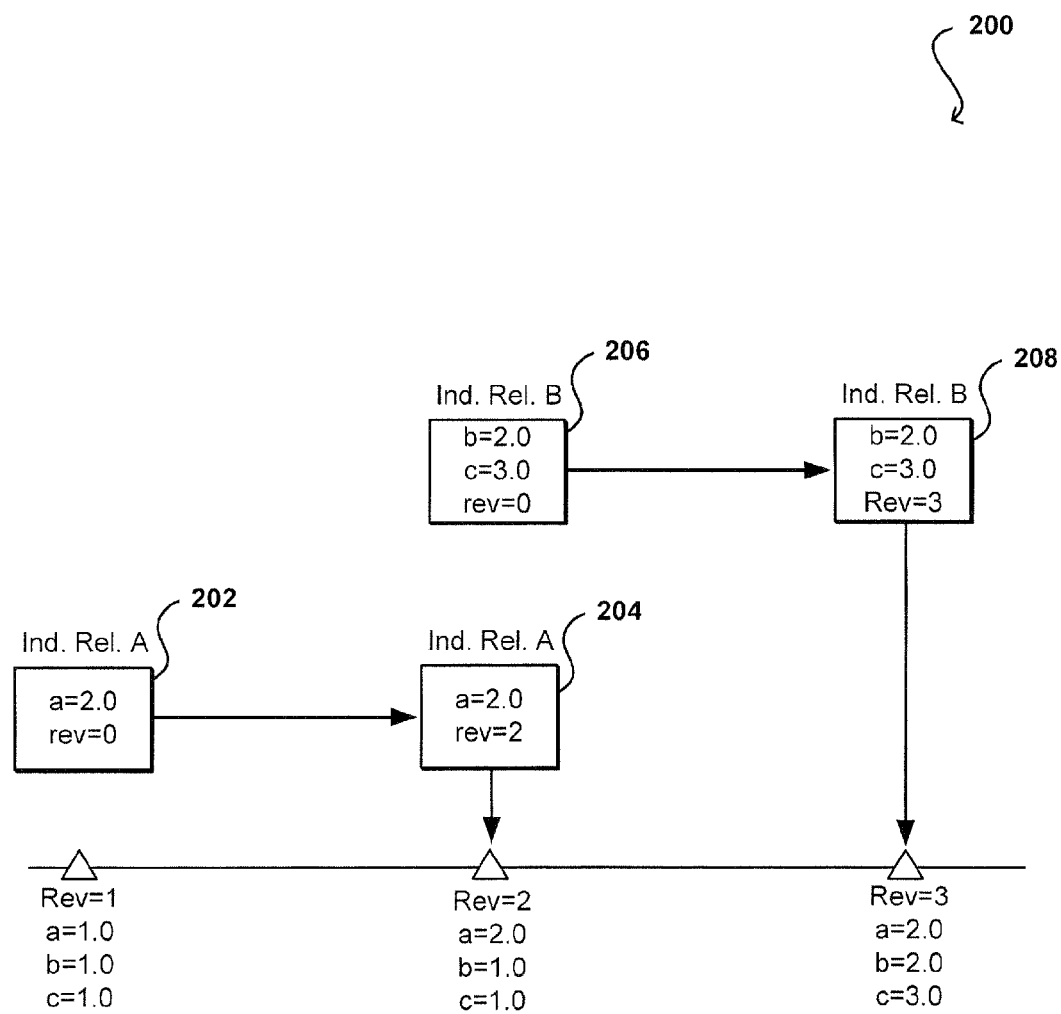
FIGS. 2(a) and 2(b) illustrate portions of an example deployment timeline that can be utilized in accordance with various embodiments.

FIG. 2(a) illustrates another Individual Release 206 for customer B, with updates to packages b and c. Even though the Individual Release starts at Revision 2, since the Individual Release does not care about the state of the Mainline the Revision number is set to 0 and no information about the update to package a is included. When the Individual Release is deployed and verified, information for the Individual Release 208 is merged back into the Mainline, resulting in updates to the Revision (to 3) and the values of b and c in the Mainline.

Figure 2B:
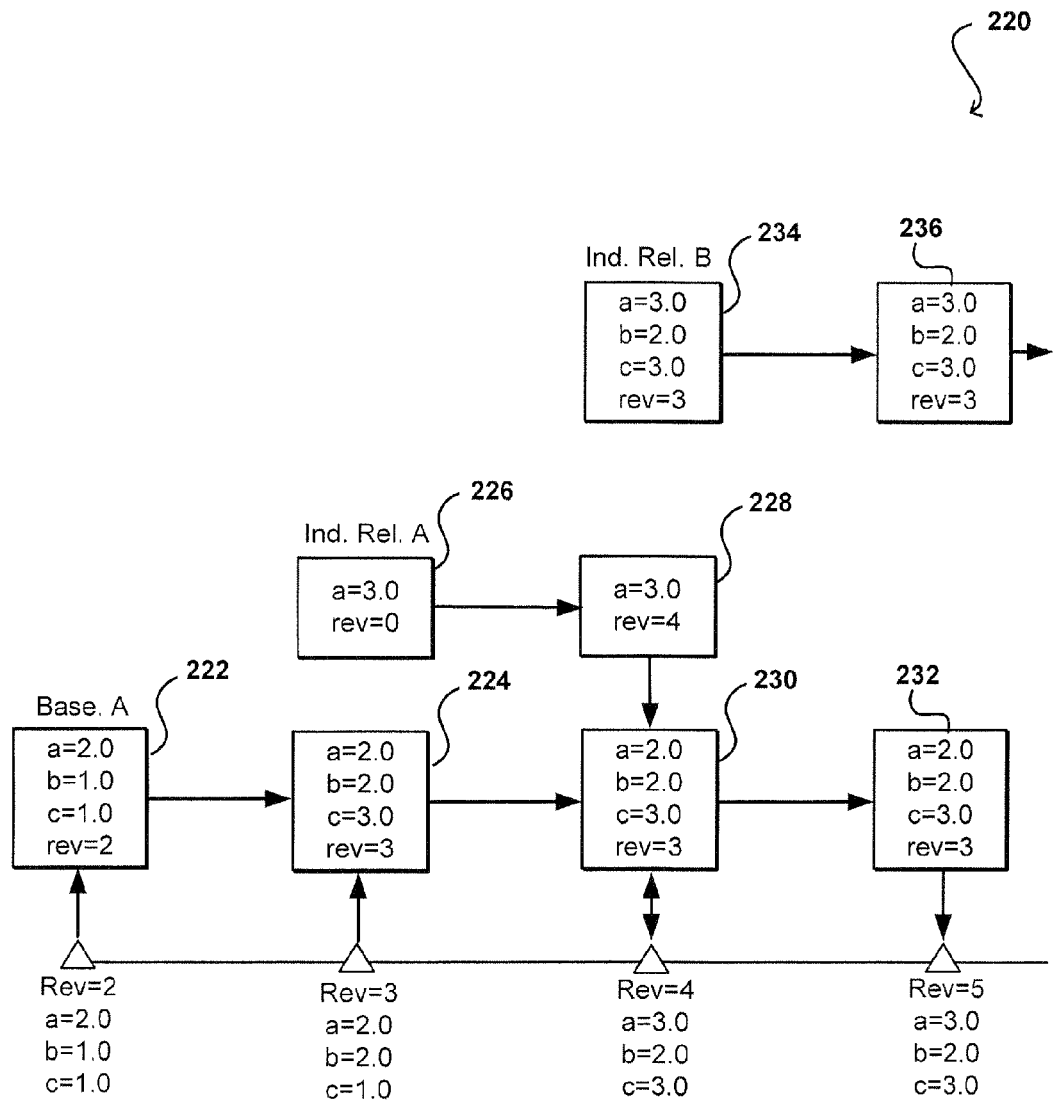

FIG. 2(b) illustrates another portion 220 of the same example Mainline 210. In this example, customer A beings work on a Baseline Release 222, starting from a Baseline corresponding to Revision 2. As can be seen, the Baseline release does not need to worry about anything that happened before Revision 2, as all that information is included in the Baseline for Revision 2. During the generation and/or deployment of Baseline A, the deployment of an Individual release 208 occurred, updating the Revision number. In at least some embodiments, the update to the Revision can be detected and that information merged into the current information for the Baseline Release 224, such that the Baseline Release includes the updated Revision number and updated values. Not every change might be reflected in the Baseline Release, however, as information for Revision 4 is not merged back into the Baseline, for any of a number of reasons, such as the state of the deployment, the changes in Revision 4, etc. When the Baseline Release is deployed and verified, the information for the Baseline Release 232 can be merged back into the Mainline 210 and the Revision number incremented accordingly.

As also illustrated, Customer A performed another Individual Release 226, which again starts with Revision value 0. When the Release is deployed and verified, information for the Individual Release 228 is merged with the Mainline 210, creating Revision 4. When customer B wants to implement a Baseline Release 234, the Baseline will start at Revision 4, including the value from the Individual Release 228. In this example, the Baseline Release 236 is still ongoing and does not reflect that Revision 5 has occurred, as the Revision of the Baseline Release will not be updated until time of a merge with the Mainline.

Such a data structure can be used to track versions of different software packages, and can enable a quick accounting of each version that is currently deployed across the distributed environment. As can be seen from these figures, however, it is possible that for a given time a Deployment will only be partially completed and/or completed for certain regions. Further, there can be multiple Deployments occurring at the same time. Thus, it can be desirable to be able to quickly determine which deployments should be evaluated for a specific point in time.

Figure 3:
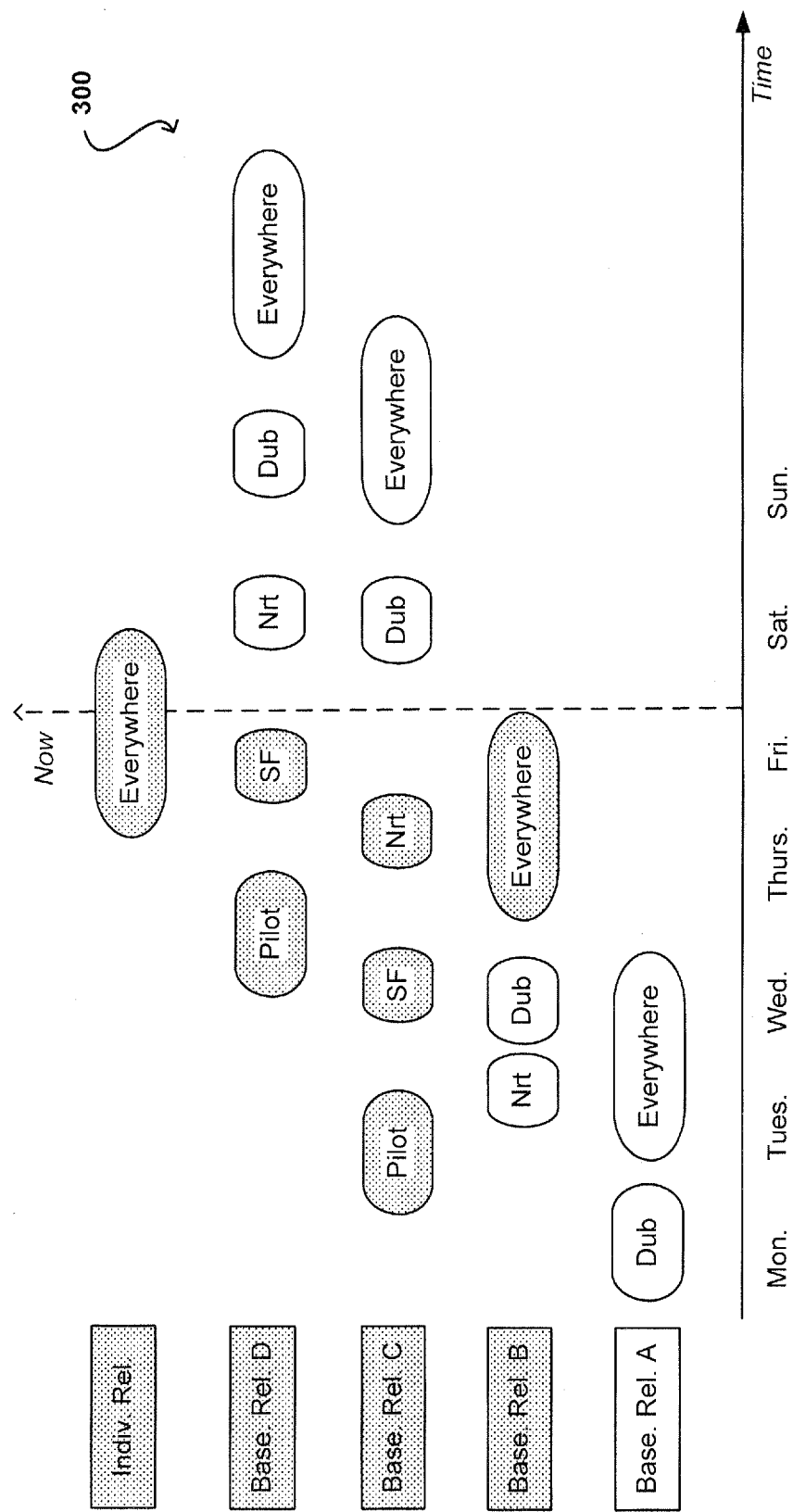
FIG. 3 illustrates an example plot of scheduled deployments that can be analyzed in accordance with various embodiments.

FIG. 3 illustrates an example plot 300 of Deployments that can be generated in accordance with various embodiments. In this example, there are four Baseline Releases (A, B, C, and D), each with an increasing version number, respectively. FIG. 3 also illustrates a timeline indicating days when portions of the deployment are scheduled. The blocks are illustrated with two shading levels, where shaded blocks indicate important releases for the current time (e.g., "Now"), and white blocks relate to Deployments or Releases that would not be considered important at the current time as will be discussed.

As illustrated, the current time falls sometime towards the end of the day on Friday. Baseline Release A was scheduled to be deployed in Dublin on Monday, and everywhere else on Tuesday, which completed on Wednesday. Each location indicated by a box can correspond to the location of a data center or server farm, in at least some embodiments. Assuming that the initial Revision version was 1, this Deployment, when verified, would increment the Revision number for the Mainline to 2. Another Release, Baseline Release B, began deployment first in Northern Europe (Nrt), then in Dublin, then everywhere else. When the Deployment was verified, the Revision number incremented to 3. Thus, if a Mainline is generated for a request at the current time, the Revision number would be 3 and the Mainline could ignore anything from Revision 2 back, which means that the Mainline does not need to worry about any of the deployments of Baseline Release A. The changes from Baseline Release A will already be merged into Baseline Release B.

It is not as simple as merely looking at the most recent verified Deployment everywhere, however, as there are two other Baseline Deployments in process across the environment, as well as an Individual Deployment. For example, Deployments of Baseline Release C have been deployed in three regions, and Deployments of Baseline Release D have been deployed in two regions, but neither of these Baseline Releases have been verified and merged back into the Mainline. Accordingly, the important Releases and/or Deployments that must be examined in order to initiate a deployment at the current time are indicated by the shaded boxes. The important regions correspond to the most recent fully verified Deployment for Baseline Release B, which was deployed everywhere. The other important Deployments include the portions of Baseline Release C and Baseline Release D that have been implemented but not yet verified and released back into the Mainline. Any Individual Release with a Revision number of 0 should also be considered to be important. Any Deployments scheduled in the future are also not considered to be important in at least some embodiments. If a customer wants to update one or more packages using a Baseline Release, the customer should consider the updates or changes in each of these important Release and Deployment portions. Using a data structure as discussed herein enables the customer, a resource manager, or another appropriate component or entity to quickly determine the important information to be analyzed, while being able to ignore the other information, which could include substantially more data than the important information.

Figure 4A:
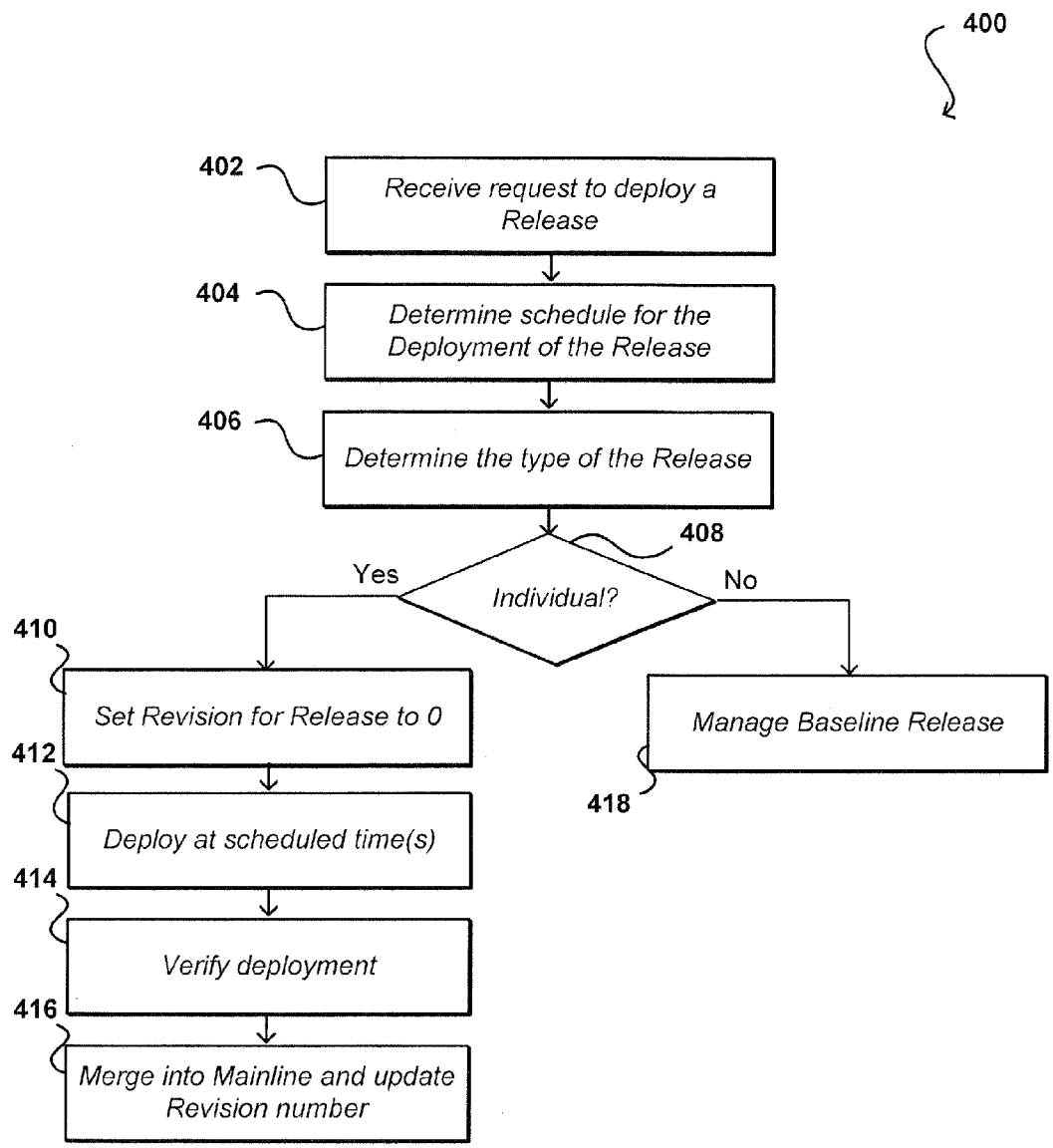
FIGS. 4(a) and 4(b) illustrate portions of an example process for managing deployment state across a set of host machines that can be utilized in accordance with various embodiments.
Figure 4B:
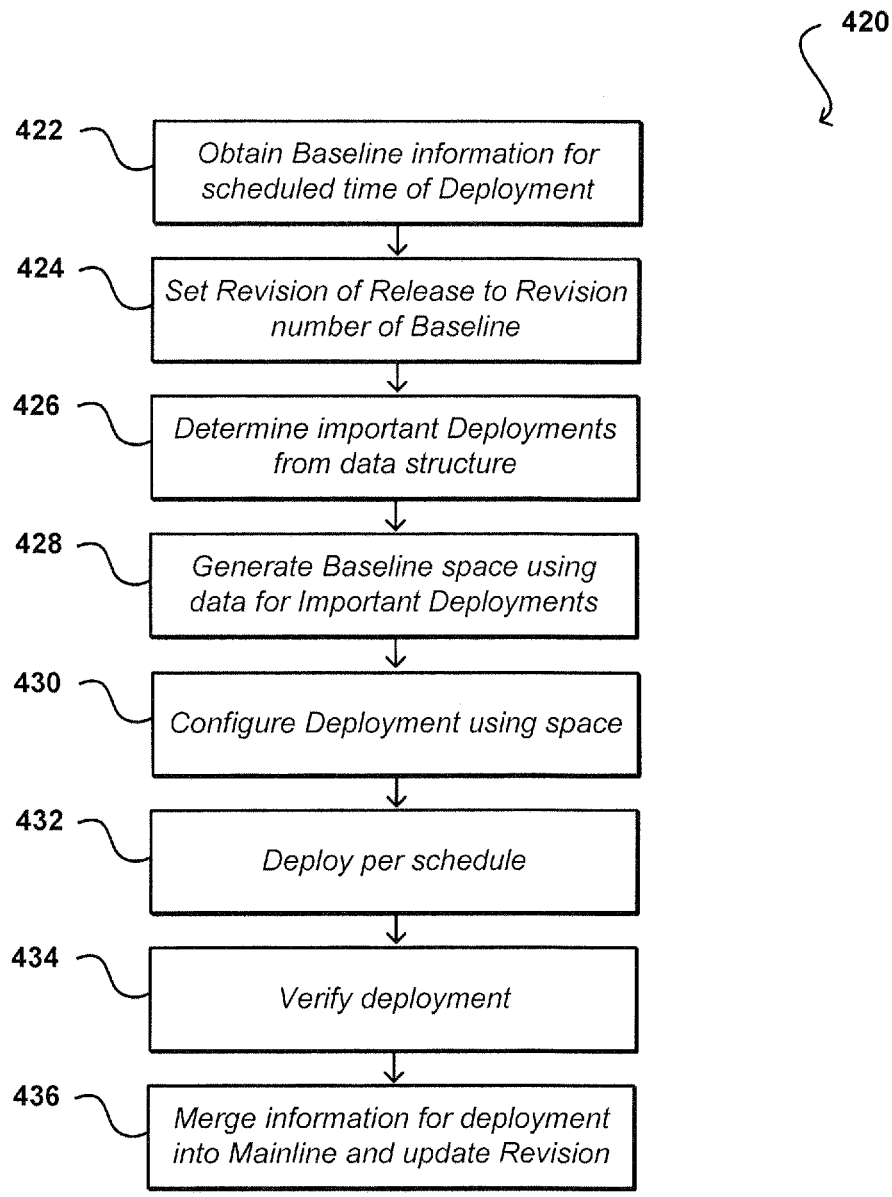

FIG. 4 illustrates an example process 400 for managing release deployments in a distributed environment that can be utilized in accordance with various embodiments. It should be understood that, for any process discussed herein, there can be additional, fewer, or alternative steps, performed in similar or different orders, or in parallel, within the scope of the various embodiments unless otherwise stated. In this example, a request to deploy a Release to a set of computing resources is received 402. In at least some embodiments, a verification of the request and/or authentication of the customer associated with the request can be determined in order to ensure that the request has access rights to such an action. In response, a schedule for the Deployment of the Release can be determined 404, as may be based upon factors such as information in the request, customer type, system load, scheduled Deployments, or other such information. The type of Release also can be determined 406, before or after the Deployment is scheduled, or at approximately the same time. If the Release is determined 408 to be an Individual Release, as discussed herein, the Revision for the Release can be set 410 to 0 such that the Release will be considered as an important Release while the Release is being deployed. The Release can then be deployed 412 at the scheduled time(s), which can include scheduled Deployments in one or more regions. Once the Deployment is completed, the Deployment can be verified 414 and then information for the Deployment can be merged 416 into the Mainline, with the Revision number of the Mainline being updated accordingly. If the Release is instead a Baseline Release, the Baseline Release can be managed 418 as illustrated in FIG. 4(b).

FIG. 4(b) illustrates a second portion 420 of the process, which can be utilized when the Release to be deployed is determined to be a Baseline Release. In this portion, the Baseline information is obtained 422 corresponding to the time of the Deployment. As discussed, the Baseline is effectively a snapshot of the Mainline at that time. As discussed, in at least some embodiments the Mainline is updated with each Revision, whereby information for any deployment is merged into the Mainline. A copy of the Mainline information can be sent to memory or storage associated with each fleet or set of computing resources, for example, such that the fleet can obtain the Mainline information from the memory instead of having to query a resource management database or other such resource, which improves the scalability of the system. The Revision of the Release can be set 424 to the Revision number of the Baseline, and important Releases and/or Deployments can be determined 426 from the data structure. As discussed, this can include the most recently Deployed Release, Baseline Releases in the process of being deployed, and Individual Releases, among other such information. The Baseline space can then be generated 428 using the important information, and the Deployment can be configured 430 using that space. When ready, the Baseline Release can be deployed 432 per the Deployment schedule, and the Deployment verified 434. Once verified, the information for the Release can be merged 436 into the Mainline and the Revision updated accordingly.

It should be understood that other information can be stored using such a data structure and considered during deployments as well. For example, there might be multiple fleets of machines, where a customer might only want to deploy a Release to one or more of those fleets. Accordingly, the data structure can manage different concurrent versions of a release by location or other such information. In some embodiments, there can be multiple Mainlines, with one Mainline for each fleet. An advantage to a data structure as described herein is that the structure is scalable and supports multiple versions and deployments. The number of Deployments in the past does not affect future Deployments, as those Deployments only rely on the important Deployments as discussed herein. A component such as a resource manager can query for the important information stored according to the data structure, without worrying about the other deployment information. The system can also allow the customer to specify various information about each Release to be deployed, such as what to a desired host state, delta changes for software packages, and when and where deployments are to be effective. A customer can also have the ability to suspend, resume, and move deployments at any time.

When determining the important information, a matching algorithm can be used to compare Revisions and Release types or other information. In at least some embodiments, the matching algorithm is lightweight enough for the system to quickly figure out effective releases for an arbitrary host or set of hosts. To find the effective Releases for a given host, for example, the matching algorithm in at least some embodiments can iterate over the Baseline Releases from new to old, and for each Release iterate over the started deployments from new to old, to attempt to match the host with the deployment destination. An initial match can determine the Baseline Release of the host, given that there can only be one Baseline Release for a host at a time. The algorithm then can iterate over the Individual releases with Revision 0 or a Revision value greater than the Revision of the Baseline Release found the from previous step. The algorithm then can iterate over the started deployments from new to old, and attempt to match a host with the deployment destination. Any matching Individual Release should be returned as an effective Individual Release for that host. Such an approach enables the limited number of relevant releases to be quickly and easily obtained. Similarly, for the Baseline Releases, the Baseline Releases can be iterated over from new to old, by deployment, until the first deployment with a destination corresponding to the entire fleet is located. All Baselines iterated over until that point then can be considered to be relevant. All other Baseline Releases before the one with first entire fleet deployment are then considered to be irrelevant to the system. Based at least in part upon the large Baseline Release X with entire fleet deployment, all Individual Releases with a Revision value of 0 greater than X can be determined to be relevant to system. Individual releases with revision between 1 and X can be determined to be irrelevant to system.

Figure 5:
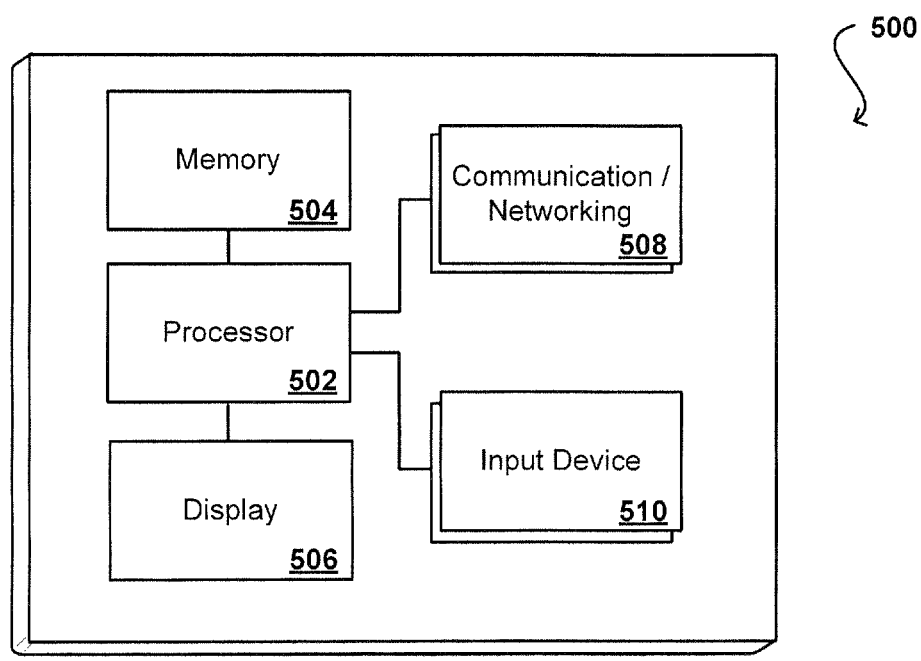
FIG. 5 illustrates components of an example computing device that can be utilized in accordance with various embodiments.

FIG. 5 illustrates a logical arrangement of a set of general components of an example computing device 500 that can be utilized in accordance with various embodiments. In this example, the device includes a processor 502 for executing instructions that can be stored in a memory device or element 504. As would be apparent to one of ordinary skill in the art, the device can include many types of memory, data storage, or non-transitory computer-readable storage media, such as a first data storage for program instructions for execution by the processor 502, a separate storage for images or data, a removable memory for sharing information with other devices, etc. The device may include, or be connected to, a display element 506, such as a touch screen or liquid crystal display (LCD), although devices might convey information via other means, such as through audio speakers. In some embodiments, the computing device 500 can include one or more communication components 508, such as a network interface card, Wi-Fi, Bluetooth, RF, wired, or wireless communication system. The device in many embodiments can communicate with a network, such as the Internet, and may be able to communicate with other such devices. In some embodiments the device can include at least one additional input element 510 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

Example environments discussed herein for implementing aspects in accordance with various embodiments are primarily Web-based, as relate to Web services and cloud computing, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

It should be understood that there can be several application servers, layers, or other elements, processes, or components, which may be chained or otherwise configured, which can interact to perform tasks as discussed and suggested herein. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between a client device and a resource, can be handled by the Web server. It should be understood that the Web and application servers are not required and are merely example components, as structured code discussed herein can be executed on any appropriate device or host machine as discussed elsewhere herein.

A data store can include several separate data tables, databases, or other data storage mechanisms and media for storing data relating to a particular aspect. The data store is operable, through logic associated therewith, to receive instructions from a server, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server, and typically will include a non-transitory computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIGS. 1 and 2. Thus, the depictions of various systems and services herein should be taken as being illustrative in nature, and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of managing deployment of a release across a set of host machines, comprising:
    receiving a request from a customer to deploy a release across a portion of the set of host machines, each of the set of host machines having a set of packages, the request indicating updates to be deployed for one or more of the packages on the portion of the set of host machines;
    determining whether the release comprises a baseline release or an individual release, the baseline release comprising a single bundle of updates for the set of packages to the set of host machines, the individual release comprising a subset of the set of packages to the portion of the set of host machines, the baseline release and individual release each independently operable;
    obtaining a snapshot of a release state of the packages on the portion of the set of host machines, the release state including a revision number associated with the set of host machines, the revision number based at least in part on verified past baseline releases to the set of host machines and verified past individual releases to the portion of the set of host machines, the snapshot further including information for a most recently completed baseline release across the set of host machines, information for any partially completed or in progress baseline release, and information for any partially completed or in progress individual release across the set of host machines;
    comparing a current state of the portion of the set of host machines with the snapshot of the release state;
    determining changes to deploy as part of the release based at least in part upon the updates indicated by the request, and the comparison between the current state of the portion of the set of host machines and the snapshot of the release state;
    deploying the changes according to a schedule for deployment of the release across the set of host machines;
    verifying the deployment after the changes are deployed across the portion of the set of host machines;
    merging information for each deployed release into a mainline for the set of host machines, the mainline including deployment information for at least the current revision number for the set of host machines, information for previous revisions being merged into the information for the current revision, the snapshot being updated to include the merged information; and
    incrementing the revision number for the set of host machines in response to verifying the deployment.

2. The computer-implemented method of claim 1, wherein the snapshot is determined before the request is received and stored in memory, and wherein obtaining the snapshot includes obtaining information for the snapshot from the memory.

3. The computer-implemented method of claim 1, wherein the revision number, and information for each release and deployment, is stored to a deployment data structure, the deployment data structure storing information by at least revision number.

4. The computer-implemented method of claim 1, wherein the snapshot of the release state includes a set of values of the mainline for the current revision.

5. The computer-implemented method of claim 1, wherein the updates to be deployed for one or more version entities include at least one of a package update, a version update, an annotation, or a configuration change for the one or more version entities.

6. A computer-implemented method, comprising:
    determining a release to be deployed across a set of computing resources, each computing resource in the set of computing resources having a set of packages;
    determining whether the release comprises a baseline release or an individual release, the baseline release comprising a single bundle of updates for the set of packages to the set of host machines, the individual release comprising a subset of the set of packages to the portion of the set of host machines, the baseline release and individual release each independently operable;
    determining state information of the set of packages for the set of computing resources, the state information including a revision number associated with the set of host machines, the revision number based at least in part on past baseline releases to the set of host machines and past individual releases to the portion of the set of host machines, the state information further including information for a most recently completed deployment of the baseline release or the individual release across the set of computing resources, the state information further including information for any deployment in progress across at least a portion of the set of computing resources;
    determining a difference between a current state of at least the portion of the set of computing resources and the state information;

determining changes to be deployed as part of the release based at least in part upon information for the release and the differences between the current state and the state information;

deploying the changes to the set of computing resources according to a deployment schedule; and updating the state information for the set of computing resources in response to the changes being deployed, wherein the state information is associated with a mainline storing deployment information by revision number, and wherein updating the state information includes incrementing the revision number, and wherein updating the state information includes merging information for the changes with the mainline.

7. The computer-implemented method of claim 6, wherein the release includes at least one of a package update, a version update, an annotation, or a configuration change for one or more version entities.

8. The computer-implemented method of claim 6, wherein the state information is stored in memory for the set of computing resources, and wherein determining the state information includes obtaining information from the memory.

9. The computer-implemented method of claim 6, wherein the release is a baseline release including a set of changes to be applied to a plurality of version entities across the set of computing resources.

10. The computer-implemented method of claim 6, wherein subsets of the set of computing resources are in different geographical areas, and further comprising:

determining a schedule for the changes to be deployed as part of the release, the changes capable of being scheduled at different times for the different geographical regions.

11. The computer-implemented method of claim 6, wherein determining the release to be deployed across the set of computing resources further comprises:

receiving a request from a customer to deploy the release across the set of computing resources, wherein the request is a Web service request received to an package programming interface (API) associated with the set of computing resources.

12. The computer-implemented method of claim 6, wherein the most recently completed deployment across the set of computing resources includes a revision number, and wherein the most recently completed deployment includes changes for any previous revision such that the state information does not need to include additional information for any previous revision.

13. The computer-implemented method of claim 6, further comprising:

first deploying the release to a subset of computing resources for testing.

14. The computer-implemented method of claim 6, wherein the release is capable of being deployed against multiple sets of computing resources, each of the set of computing resources having a respective set of state information for determining changes to be deployed as part of the release.

15. The computer-implemented method of claim 6, further comprising:

determining information for an individual deployment across the set of computing resources, the information being provided with the state information.

16. A computing device, comprising:

at least one device processor; and memory including instructions that, when executed by the at least one device processor, enables the computing device to:

determine a release to be deployed across a set of computing resources, each computing resource in the set of computing resources having a set of packages;

determine whether the release comprises a baseline release or an individual release, the baseline release comprising a single bundle of updates for the set of packages to the set of host machines, the individual release comprising a subset of the set of packages to the portion of the set of host machines, the baseline release and individual release each independently operable;

determine state information of the set of packages for the set of computing resources, the state information including a revision number associated with the set of host machines, the revision number based at least in part on past baseline releases to the set of host machines and past individual releases to the portion of the set of host machines, the state information further including information for a most recently completed deployment of the baseline release or the individual release across the set of computing resources, the state information further including information for any baseline deployment or individual deployment in progress across at least a portion of the set of computing resources;

compare a current state of at least the portion of the set of computing resources with the state information;

determine changes to be deployed as part of the release based at least in part upon information for the release and the comparison between the current state and the state information;

deploy the changes to the set of computing resources according to a deployment schedule; and update the state information for the set of computing resources in response to the changes being deployed, wherein the state information is associated with a mainline storing deployment information by revision number, and wherein updating the state information includes incrementing the revision number and merging information for the changes with the mainline.

17. The computing device of claim 16, wherein subsets of the set of computing resources are in different geographical areas, and wherein the instructions when executed further cause the computing device to:

determine a schedule for the changes to be deployed as part of the release, the changes capable of being scheduled at different times for the different geographical regions.

18. The computing device of claim 16, wherein the most recently completed baseline deployment across the set of computing resources includes a revision number, and wherein the most recently completed baseline deployment includes changes for any previous revision such that the state information does not need to include additional information for any previous revision.

19. The computing device of claim 16, wherein the instructions when executed further cause the computing device to:

first deploy the release to a subset of the computing resources for testing.

20. The computing device of claim 16, wherein the instructions when executed further cause the computing device to:

determine information for any deployment of an individual deployment across the set of computing resources, the information being provided with the state information.

21. The computing device of claim 16, wherein the instructions when executed further cause the computing device to:

merge information for any completed individual deployment into the state information.

22. A non-transitory computer-readable storage medium including instructions that, when executed by at least one processor of a computing device, cause the computing device to:

determine a release to be deployed across a set of computing resources, each computing resource in the set of computing resources having a set of packages;

determine whether the release comprises a baseline release or an individual release, the baseline release comprising a single bundle of updates for the set of packages to the set of host machines, the individual release comprising a subset of the set of packages to the portion of the set of host machines, the baseline release and individual release each independently operable;

determine state information of the set of packages for the set of computing resources, the state information including a revision number associated with the set of host machines, the revision number based at least in part on past baseline releases to the set of host machines and past individual releases to the portion of the set of host machines, the state information further including information for a most recently completed deployment of the baseline release or the individual release across the set of computing resources, the state information further including information for any baseline deployment or individual deployment in progress across at least a portion of the set of computing resources;

compare a current state of the set of computing resources with the state information;

determine changes to be deployed as part of the release based at least in part upon information for the release and the comparison between the current state and the state information;

deploy the changes to the set of computing resources according to a deployment schedule; and update the state information for the set of computing resources in response to the changes being deployed, wherein the state information is associated with a mainline storing deployment information by revision number, and wherein updating the state information includes incrementing the revision number and merging information for the changes with the mainline.

23. The non-transitory computer-readable storage medium of claim 22, wherein subsets of the set of computing resources are in different geographical areas, and wherein the instructions when executed further cause the computing device to:

determine a schedule for the changes to be deployed as part of the release, the changes capable of being scheduled at different times for the different geographical regions.

24. The non-transitory computer-readable storage medium of claim 22, wherein the instructions when executed further cause the computing device to:

determine information for any deployment of an individual deployment across the set of computing resources, the information being provided with the state information; and merge information for any completed individual deployment into the state information.

\* \* \* \* \*